(12) United States Patent
Savolainen (10) Patent No.: US 8,600,399 B2
(45) Date of Patent: Dec. 3, 2013

(54) ANTENNA ARRANGEMENT

(75) Inventor: Risto Kalevi Savolainen, Le Rouret (FR)

(73) Assignee: D-Per Technologies Limited, London (GB)

(*) Notice: Subject to any disclaimer, the term of this patent is extended or adjusted under 35 U.S.C. 154(b) by 0 days.

(21) Appl. No.: 12/877,371

(22) Filed: Sep. 8, 2010

(65) Prior Publication Data

US 2010/0328158 A1  Dec. 30, 2010

Related U.S. Application Data

(62) Division of application No. 12/090,650, filed as application No. PCT/FI2006/050448 on Oct. 18, 2006, now abandoned.

(30) Foreign Application Priority Data

Oct. 19, 2005  (EP) .................................... 05109729

(51) Int. Cl.
   *H04W 24/00* (2009.01)
   *H04M 1/00* (2006.01)
   *H04B 1/38* (2006.01)

(52) U.S. Cl.
   USPC ............... 455/456.1; 455/456.6; 455/553.1; 455/558

(58) Field of Classification Search
   USPC ........ 455/41.1, 557–558, 333, 3.02, 25, 63.4, 455/193.1, 553.1, 456.1, 456.5, 456.6
   See application file for complete search history.

(56) References Cited

U.S. PATENT DOCUMENTS

| | | | | |
|---|---|---|---|---|
| 5,335,276 | A | * 8/1994 | Thompson et al. | ........... 380/266 |
| 5,598,032 | A | * 1/1997 | Fidalgo | ........................ 257/679 |
| 5,870,065 | A | 2/1999 | Kanba et al. | |
| 5,936,593 | A | 8/1999 | Mandai et al. | |
| 6,028,568 | A | 2/2000 | Asakura et al. | |
| 6,064,351 | A | 5/2000 | Mandai et al. | |
| 6,075,491 | A | 6/2000 | Dakeya et al. | |
| 6,307,512 | B1 | * 10/2001 | Geeraert | ....................... 343/702 |
| 6,437,745 | B1 | * 8/2002 | Vaisanen et al. | .............. 343/702 |
| 6,518,927 | B2 | * 2/2003 | Schremmer et al. | .......... 343/702 |

(Continued)

FOREIGN PATENT DOCUMENTS

| | | |
|---|---|---|
| FI | 114260 B | 9/2004 |
| JP | 2005-244742 | 9/2005 |

(Continued)

*Primary Examiner* — Simon Nguyen
(74) *Attorney, Agent, or Firm* — Young & Thompson (57) ABSTRACT

An antenna (2-20) for use in a mobile device (1-1) includes elements for receiving (2-5, 3-1, 4-1, 5-1, 6-5) a signal from a satellite positioning system; a first layer of dielectric material (2-4a, 2-4b, 3-2, 3-3, 5-2, 4-3, 5-2, 5-3, 6-4, 6-15) and a second layer of dielectric material (2-4a, 2-4b, 3-2, 3-3, 5-2, 4-3, 5-2, 5-3, 6-4, 6-15), wherein the elements for receiving (2-5, 3-1, 4-1, 5-1, 6-5, 7-6) the signal is at least partly between the first dielectric layer (2-4a, 2-4b, 3-2, 3-3, 5-2, 4-3, 5-2, 5-3, 6-4, 6-15) and the second dielectric layer (2-4a, 2-4b, 3-2, 3-3, 5-2, 4-3, 5-2, 5-3, 6-4, 6-15).

17 Claims, 5 Drawing Sheets

(56) References Cited

U.S. PATENT DOCUMENTS

| | | |
|---|---|---|
| 6,580,397 B2 | 6/2003 | Lindell |
| 6,804,541 B1* | 10/2004 | Muramatsu et al. ........... 455/573 |
| 7,024,225 B2* | 4/2006 | Ito ................................. 455/558 |
| 7,171,237 B2* | 1/2007 | Vangala ........................ 455/557 |
| 7,296,754 B2* | 11/2007 | Nishizawa et al. ........... 235/492 |
| 7,711,391 B2* | 5/2010 | Zatloukal et al. ............. 455/558 |
| 7,945,290 B2* | 5/2011 | Souissi et al. ................. 455/557 |
| 2002/0082992 A1* | 6/2002 | Ritter ............................. 705/41 |
| 2003/0017849 A1* | 1/2003 | Koga et al. .................... 455/558 |
| 2004/0246180 A1 | 12/2004 | Okado |
| 2005/0212690 A1* | 9/2005 | Nishikawa ................. 340/932.2 |
| 2006/0142063 A1* | 6/2006 | Monsacre ..................... 455/558 |
| 2007/0213096 A1* | 9/2007 | Bella et al. .................... 455/558 |
| 2007/0290578 A1* | 12/2007 | Horie ............................ 310/344 |

FOREIGN PATENT DOCUMENTS

| | | |
|---|---|---|
| RU | 2107925 | 3/1998 |
| RU | 2137266 | 9/1999 |
| WO | 98/58509 | 12/1998 |
| WO | 03/023900 | 3/2003 |
| WO | 2004/021511 | 3/2004 |
| WO | 2005/022685 | 3/2005 |

* cited by examiner

ANTENNA ARRANGEMENT

This application is a divisional application of application Ser. No. 12/090,650 filed May 31, 2008, which is a National Phase of PCT/FI2006/050448 filed Oct. 18, 2006, which claims the priority of European Application No. 05109729.3 filed Oct. 19, 2005. The entire contents of each of the above-identified applications are hereby incorporated by reference.

FIELD OF THE INVENTION

The present invention relates to communications systems and more particularly to an antenna and a module for locating user equipment in a communications system.

BACKGROUND OF THE INVENTION

The accurate location of user equipment, such as a GSM (Global System for Mobile Communications) mobile device, cannot be determined using the information from a cellular network. The information enables the location only of an accuracy of about 100-300 meters in rural areas and 50-100 meters in city areas. For example, in a case of an emergency call, it is vital to find out the exact location from which the call was made to be able to get help to the site as fast as possible.

For better accuracy, one possibility is the use of GPS (Global Positioning System) receivers, which offer better accuracy. However, they are expensive and not widely carried and used by public. In addition, GPS receivers do not work reliably or at all indoors and in canyons, like in between high buildings.

Another possibility is to add high accuracy satellite positioning system functionality to the existing non-satellite positioning system user equipment without any modifications to the equipment itself but only by inserting a subscriber identity module, a SIM card comprising a satellite positioning system receiver and an antenna.

However, the problem with the SIM card with such a receiver and especially an antenna is the radio signal reception. One of the disadvantages associated with the above arrangement is that the receiver and antenna are inside the mobile device in proximity of a ground plane and other metallic parts and often covered with a battery. In this kind of circumstances traditional antennas are too big and do not work.

US 2002/0082992 A1 discloses a chip card with an integrated time-determining system and a billing method for billing a call to a user identified with an identification card in a telecommunications network. In it a GPS receiver determines the duration of the calls. An advantage of the invention is that the user cannot falsify the determined time.

U.S. 2004/0246180 A1 discloses a dielectric antenna, an antenna mounted substrate and a mobile communication machine. The dielectric antenna has a dielectric base, a linear element, at least one bending portion, a power supply terminal, a linear conductor and a ground terminal.

WO 98/58509 A discloses a chip card method for communication between an external device and a chip card. The chip card contains at least one coil for establishing communication via radio waves between said processing system and external device outside the mobile communication station.

U.S. Pat. No. 6,580,397 B2 discloses an arrangement for a mobile terminal. An antenna system comprises a casing, a screening device, an end-fed antenna and a counterpoise element. The end-fed antenna is adapted to be fed, during transmission, against the counterpoise element by the radio electronic circuits.

BRIEF DISCLOSURE OF THE INVENTION

It is thus an object of the present invention to provide an apparatus to solve the above problems. The objects of the invention are achieved by an arrangement, which is characterized by what is stated in the independent claims. The preferred embodiments of the invention are disclosed in the dependent claims.

The invention is based on the idea of providing an antenna for use in a mobile device, the antenna being characterized in that it comprises means for receiving a signal from a satellite positioning system, a first layer of dielectric material and a second layer of dielectric material, wherein the means for receiving the signal is at least partly between the first dielectric layer and the second dielectric layer.

It is an advantage of the arrangement of the invention that the GPS receiver can be used in circumstances where traditional antennas would not work.

BRIEF DESCRIPTION OF THE DRAWINGS

In the following the invention will be described in greater detail by means of preferred embodiments with reference to the attached drawings, in which.

DETAILED DESCRIPTION OF THE INVENTION

According to the mirror image principle of the antenna theory, the antenna should be ¼ wavelength (in case of the GPS frequency of 1.575 GHz about 47.6 mm) distance away from a metal or a conducting ground level or other metal part(s) to be efficient.

In one embodiment, by adding carefully measured dielectric material layers on both sides of an antenna element, the element can be distanced electronically from the metal parts, thus making the antenna efficient without extending its physical dimensions, especially its thickness.

The mobile device of the invention and its embodiments can be any mobile device like 2G (Generation), 2.5G, 3G or 4G mobile device. It can be e.g. a mobile station, a cellular mobile station, a communicator or a computer. The detailed structure and operation of the mobile device and the communications systems are not relevant to the invention, and therefore they are described only to the extent that helps understanding the invention. Furthermore, it should be noted that the invention can be applied to different kind of positioning systems and satellite systems and to different kind of communications systems and networks like fixed networks and packet switched networks or combination thereof and/or to wireless data transmission networks, such as Mobile-IP (Internet Protocol) networks and user equipment thereof.

For the invention and its embodiments a SIM (Subscriber Identity Module) card can be defined to be a card removably insertable into the user equipment containing data for subscriber identification and/or encipherment of radio communication and/or other security related information. However, it is to be noted that the SIM card according to the invention and its embodiments can but does not have be able to identify the subscriber. The card can be e.g. a SIM card or a USIM (Universal Subscriber Identity Module) card. The structure, the size, the physical dimensions, the weight and the layout of the card can be as described as follows, but they can also be different ones.

A processor in the SIM card or working with the SIM card can control the access to a memory of the SIM card or to a memory working with the SIM card used for the location of the user device e.g. in response to the identity of the location request initiator. The control can mean e.g. the prevention of a location initiator from getting to the information of the memory. This means that in one way of using the SIM card there is no direct access to the memory of the SIM card although there can be one. The SIM card can also recognize the location initiator being authorized to get the information directly from the memory of the SIM card without any authorization requests for locating the user equipment. It is also possible that the user has given for some or all persons and/or authorities preauthorization for the direct access to the memory.

The SIM card can also be a so-called tamper-proofed device offering enough protection in relation to the location of a single person.

The SIM card can also be adapted to fit to different kinds of user equipment, to different kinds of mobile devices such that when inserted e.g. into a conventional cellular mobile station it can adapt to the system of the conventional mobile station and cause it to operate for locating the mobile station.

The SIM card can also comprise and/or be in cooperation with logic(s) and/or software program(s) or application(s), which can control the operation of the invention and its embodiments. The logic(s), the program(s) and/or the application(s) can be in the SIM card, in communication with the SIM card and/or it/they can be loaded to the SIM card and/or to the user equipment for carrying out the invention and its embodiments. The applications comprise e.g. Java and Symbian applications.

In other words, the SIM card can comprise means e.g. a program, for calculating the current location, like the coordinates, of the user equipment. Thus the whole processing of the positioning data and/or the current location can be done with the GPS chip and the SIM processor. The processor(s) of the user equipment are not needed in the calculation but it/they can also be used.

The SIM card can also comprise means e.g. a program, for sending the temporary data, pseudo data to the server for the calculation of the current location of the user equipment.

The Java and Symbian applications can process the location information received from the SIM card and/or from the server in many ways. The Java application can get the location information over the GPRS (General Packet Radio Service) network via the MSLC (Mobile Serving Location Center) server.

The SIM card can be virtual or separate, stand-alone card. For the invention and its embodiments the SIM card can be partly or wholly fixed to the user equipment or partly or wholly removably insertable into the user equipment. It can thus comprise one or more parts. The SIM card can also have different sizes, thicknesses and volumes. Although in the following the name SIM card will be used, it is to be understood that it also refers to different kind of smart cards like to an ICC card (Integrated Circuit Card) or to a chip card. What is important for the invention and its embodiments is that it is a module with embedded information receiver and/or antenna.

The antenna element and other functional blocks can receive information for locating or for assisting the locationing of the equipment. Thus they can be in communication with e.g. a GPS (Global Positioning System) or an AGPS (Assisted GPS) system or other satellite-positioning systems like NAVSTAR (NAVigation System using Timing And Ranging), GLONASS (Global Navigation Satellite Service) or GALILEO. It must be noted that the module can comprise one or more receivers and/or antennas each of which is adapted to e.g. different positioning systems and/or frequencies.

In other words, the accurate location of a mobile device can be detected by using a satellite positioning system, such as GPS or other radio receiver or transmitter. The GPS receiver can be embedded in a SIM card.

The antenna, antenna element can be within the module or it can be provided as a separate component. Also the antenna and/or a ground of the user device can be used. If then the receiver unit is in the module, the sensitivity of the system can be increased compared to the situation where both the receiver and the antenna are in the module. This however can require the use of new user device.

The invention and its embodiments are based on the idea of adding a high accuracy satellite positioning system, like GPS, functionality to the existing non-satellite positioning system, like non-GPS, user equipment without any modifications to the device itself but only by inserting a new positioning system module, like AGPS enabled SIM card in it. It is also possible to insert the high accuracy satellite positioning system functionality to the existing satellite positioning system user equipment.

It is possible that the user can locate his/hers position by his/hers own initiative or the user can be located by the initiative of a third person or a service. However, before the third person or an external service can locate the user equipment, it is possible for the user to accept or reject the external positioning initiative unless it is generated by emergency services with an authority to do so by law, or by an application or service, which is authorised by the user. In these cases the remote location request sender can be authenticated by a positioning application, like the AGPS application on the SIM card prior to requesting a positioning subsystem, like the AGPS subsystem to generate the location data. The authentication can use digital signature (PKI) or other available secure authentication methods to control the access to the AGPS subsystem functionality. The authentication can also be used for controlling the accessing to the location information for applications running on the SIM or mobile device.

The SIM module can also comprise means for controlling the access to the positing data. When an inquiry for positioning data is received, said means can check the right to use and/or the right to get said positioning data based on e.g. the identity of the sender of the inquiry. The SIM module can transmit the positioning data or deny its transmission. The SIM module can also calculate the location and transmit e.g. the coordinates to the initiator of the inquiry. The SIM card can also ask the user of the user device for the acceptance of the transmission of said data.

Figure 1:
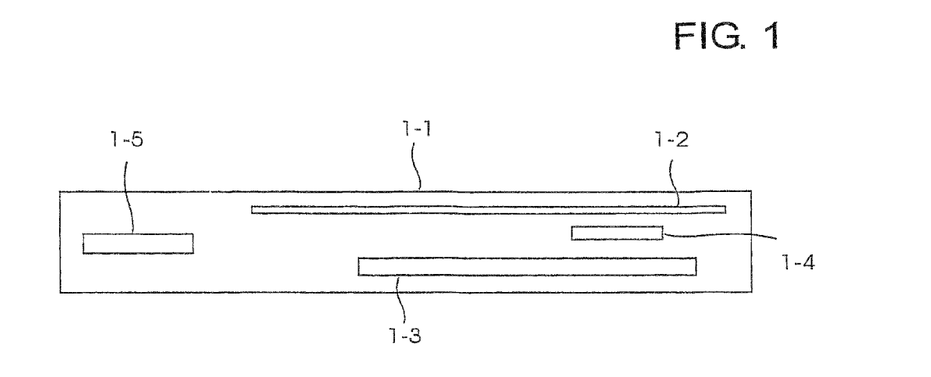
FIG. 1 shows a cross section view of a mobile device.

FIG. 1 shows a cross section view, a side view of a mobile device 1-1. It comprises of a ground plane 1-2 of the mobile device, which plane can be e.g. a metallic layer, plane or wire with different sizes and shapes in the device and/or in the circuit board to be attached to the mobile device. It comprises an antenna 1-5 of the mobile device, and a battery 1-3. The FIG. 1 also shows an element 1-4 according to the invention and its embodiments. The element 1-4 can be e.g. the SIM card, and it can be used for receiving RF signals from different positioning systems like from the satellite positioning system for determining positioning data at least partly in response to said signals. The element can comprise RF receiver/transmitter that can be embedded in a SIM card and/or in a USIM card (Universal Subscriber Identity Module). As shown in the FIG. 1, the element, subscriber module(s) is typically inserted in the mobile device in proximity of the ground plane 1-2 and potentially covered by a battery 1-3.

The device chassis consists typically on printed circuit board (PCB), electronics and a metal ground plane. The structure and measures can vary depending on the device model. The SIM card including the antenna and being 0.76 mm think, may be located in close proximity (~1 mm) of the ground plane and other parts containing metal, like battery.

Figure 2A:
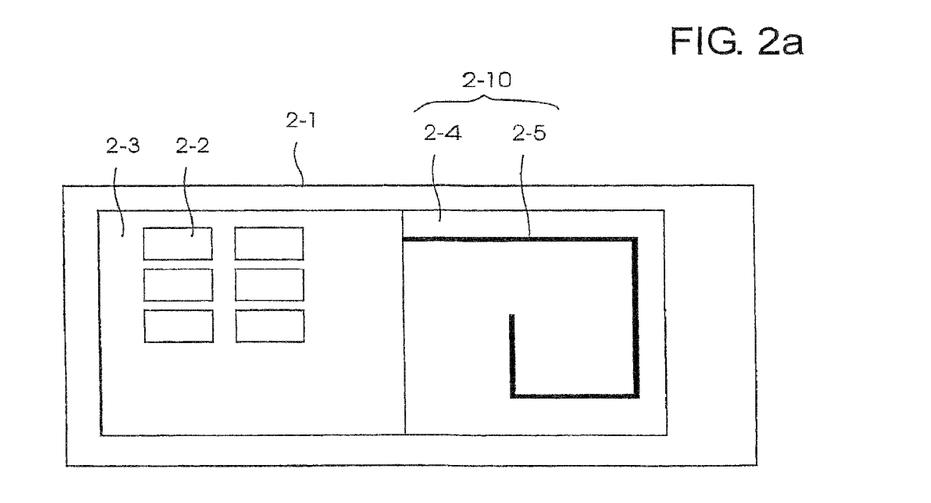
FIG. 2A shows a subscriber identity module according to the invention and its embodiments.

FIG. 2A shows the element 1-4 of FIG. 1 and it is named as a subscriber identity module, the SIM card, although, as stated above, it can also be another type of a card, a circuit board, electronics and/or software that can receive data from a positioning system and/or process said data for determining positioning data and/or conveying positioning data. The element 2-1 can comprise of one or more modules, which can be separate modules or integrated modules and which modules can process one or more independent or interrelated functions. The element 2-1 comprises one or more contacts 2-2 and an RF receiver/transmitter, transceiver element 2-3. The element 2-3 can be a circuit board with functions for receiving and/or transmitting signals. The element 2-3 can handle different types of signals, like RF (Radio Frequency) signals, IF (Intermediate Frequency) signals and baseband signals e.g. to and from wireless transmissions, wireline transmissions and local area network. One or more antenna elements are denoted as 2-5 and the element, which can adapt to different frequencies is denoted as 2-4. This adapting means can comprise one or more dielectric layers. One or more dielectric layers 2-4, 2-4a, 2-4b can surround the antenna element 2-5 wholly or partly. The layers can be such implemented that on one side of the antenna element is arranged a first dielectric layer and on another side of the antenna element is arranged a second dielectric layer. The dielectric layers can also be on top of each other. The first dielectric layer and/or the second dielectric layer can also be in contact with another dielectric material, with conducting material, with (semi)insulating material or other material with certain electromagnetic properties. The antenna 2-10 can comprise antenna elements 2-5 and adapting means 2-4. The receiving means can be adapted to receive the signal from a satellite positioning system. At least one of the dielectric layers can be adapted to the frequency of the signal.

The ground layer of the RF transceiver relative to the antenna can be connected to the electrical ground contact of a subscriber identity module.

Figure 2B:
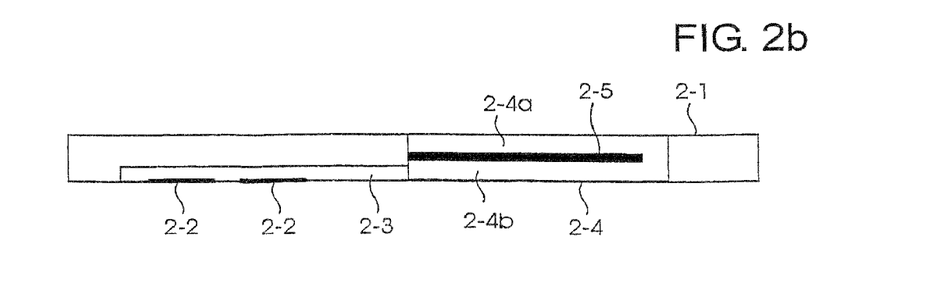
FIG. 2B shows a cross section view of the subscriber identity module according to the invention and its embodiments.

FIG. 2B shows a cross section view of the module according to FIG. 2A.

Figure 3:
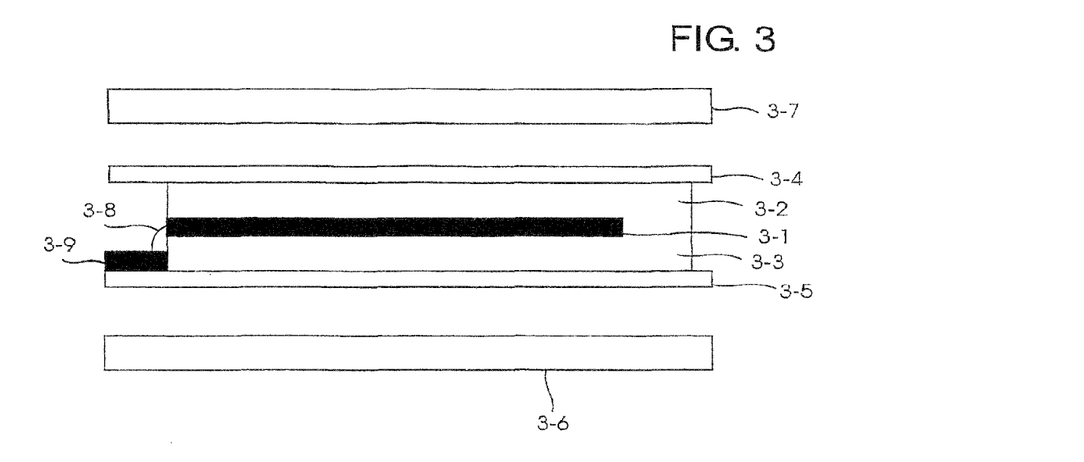
FIG. 3 illustrates an antenna structure according to the invention and its embodiments.

FIG. 3 illustrates an antenna and the adapting means according to the invention and its embodiments. The structure can be named as a Symmetric Dielectric SIM Antenna. The structure can comprise of three layers: a bottom dielectric layer 3-3, one or more antenna elements 3-1 and a top dielectric layer 3-2. Both the bottom dielectric layer and the top dielectric layer can be made of a thin ceramic or other material with high dielectric constant and/or low dielectric loss. The dielectric layers can be made of same material or of different materials. The thicknesses of the dielectric layers can be so designed that they equal to ¼ of the RF signal wavelength in the used dielectric material, thus maximizing the signal gain. The structure 3-1, 3-2, 3-3 does not have form, build metallic or other ground plane, but it can alternatively use the ground plane 3-6 of the mobile device as its own ground plane.

As a result, the structure, the antenna can be electronically large in volume but physically thin and small in volume, and fulfilling the desired ¼ wavelength distance from the metal parts for maximum gain. However, the dielectric loss of the used material(s) 3-2 and 3-3 and small physical size of the antenna can cause some reduction of the performance of the antenna. The antenna element can be fed 3-8 to the circuit board 3-9. The battery 3-7 can cover the structure.

The structure of the antenna can be e.g. a monopole, a dipole, an inverted-F, a PIFA, a fractal, a ceramic chip and a patch antenna providing different radiation patterns and developed for and used with mobile devices.

Also one or more layer of plastic 3-4, 3-5 can cover said structure. The plastic covering can be e.g. for packaging purposes and against wear.

The antenna and the RF transceiver can be integrated on the same substrate of an integrated circuit or a circuit board or they can be separate integrated circuits or components.

Figure 4:
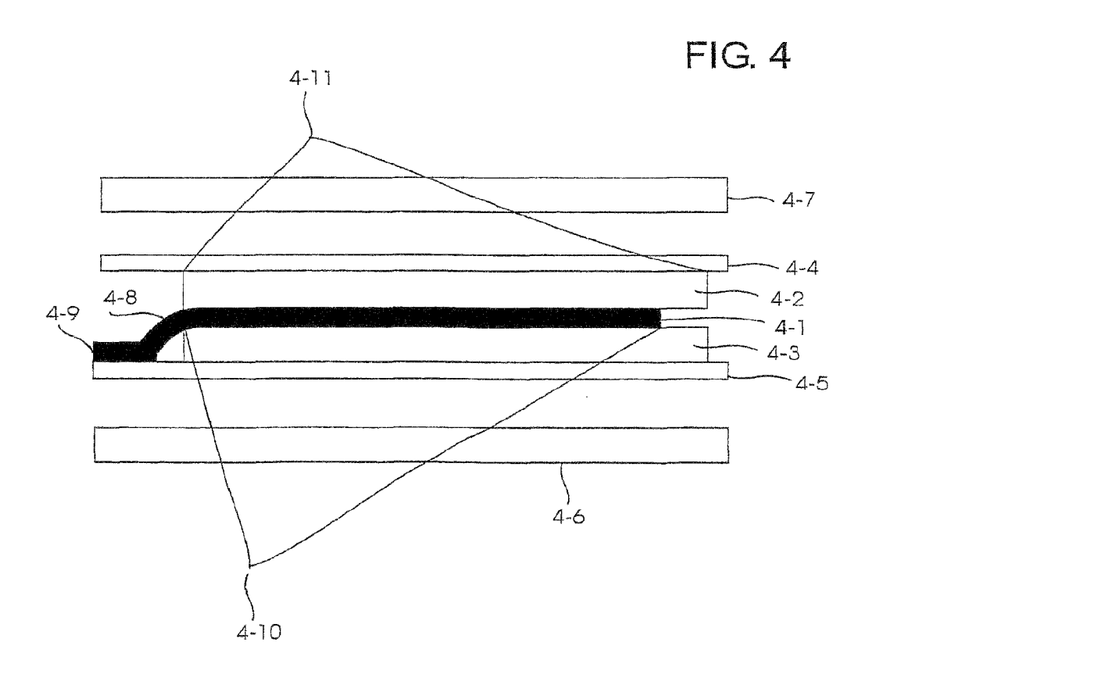
FIG. 4 illustrates an antenna structure according to the invention and its embodiments.

FIG. 4 illustrates an antenna and the adapting means according to the invention and its embodiments. The antenna element 4-1 and the circuit board 4-9 can be one integral structure 4-8. The antenna element can have the same length 4-10 within the dielectric material as the dielectric material 4-11. Alternatively the length of the antenna element can be longer or shorter than the length of the dielectric material. The antenna element can be surrounded by dielectric layer(s) 4-2, 4-3 and the whole structure can be covered by thin layer of plastic, 4-4, 4-5. The subscriber identity module can be covered at least partially by at least one layer of plastic possibly excluding the contacts.

The ground plane 4-6 can be the ground plane of the device or a plane attached to the card.

Figure 5:
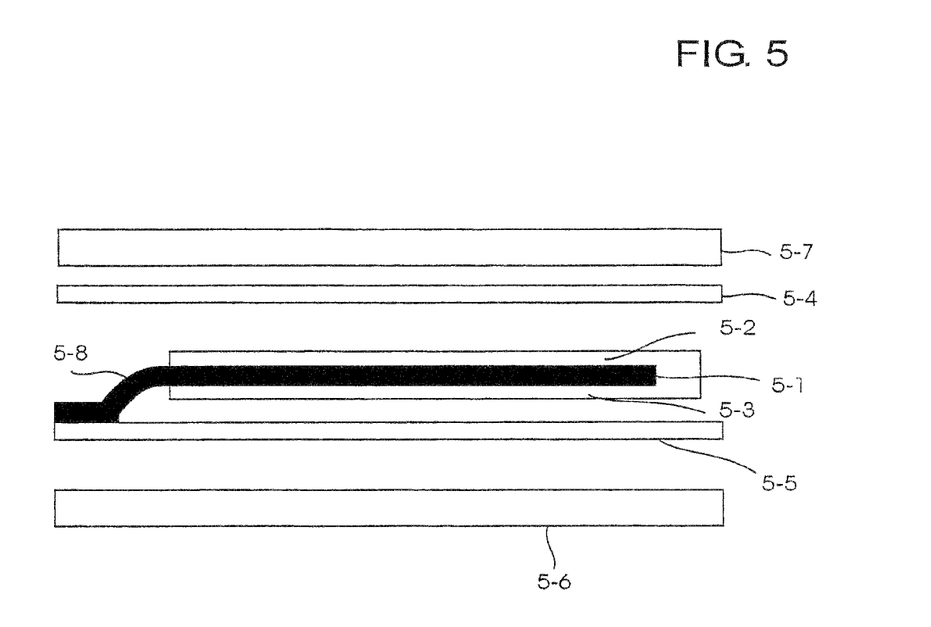
FIG. 5 illustrates an antenna structure according to the invention and its embodiments.

FIG. 5 illustrates an antenna 5-1 and the adapting means 5-2, 5-3 according to the invention and its embodiments. It can be named as an Asymmetric Dielectric SIM Antenna. The structure has been adjusted such that the top layer thickness and the bottom layer thickness of dielectric material are different. The adjustment can be e.g. such that either the top layer thickness or the bottom layer thickness is exactly or approximately 2 times thicker than the other layer. The thicker layer can be e.g. ½ of the wavelength in the dielectric material while the thickness of the other layer remains as ¼ wavelength. Based on the mirror image principle, this arrangement can substantially cancel the RF radiation or reflections from one side of the antenna and make it immune of near by metal parts on that side.

This structure can also be surrounded by plastic layers 5-4, 5-5. The Figure also shows the battery 5-7 and the ground plane 5-6.

Figure 6A:
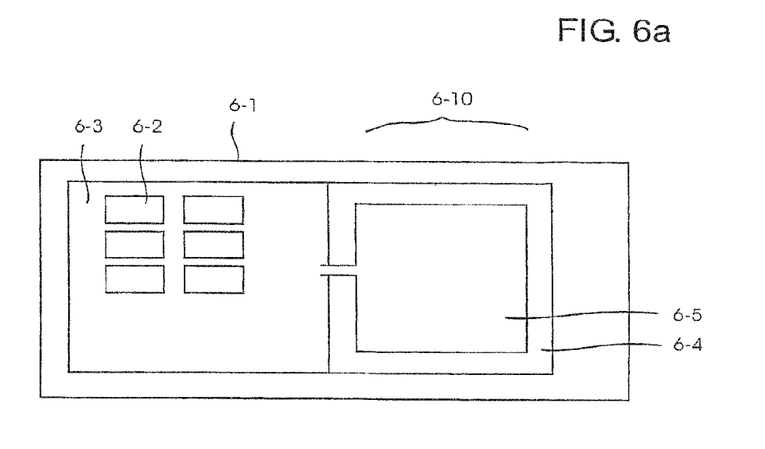
FIG. 6A shows a subscriber identity module according to the invention and its embodiments.
Figure 6B:
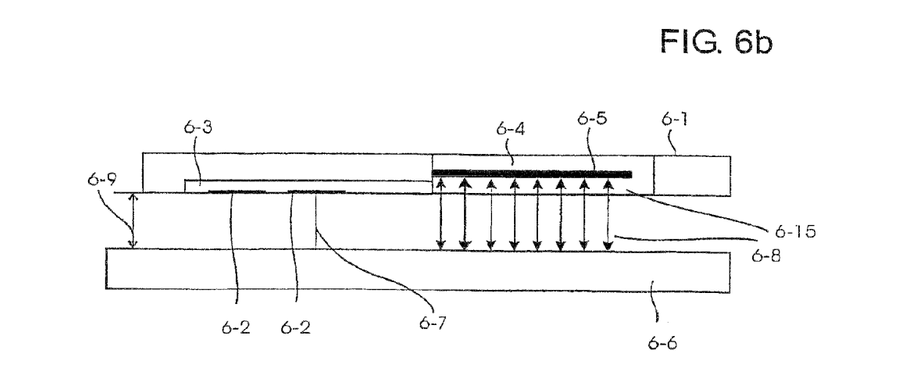
FIG. 6B shows a cross section view of the subscriber identity module according to the invention and its embodiments.

Instead of a wire antenna element, a dielectric resonator and/or a non-radiating resonator can be used to detect and receive the RF signal(s). The resonator element can comprise a metallic layer, a plane 6-5. FIGS. 6A and 6B show said subscriber identity module and a cross section view of the module. The module 6-1 comprises of one or more contacts 6-2 and a RF receiver/transmitter element 6-3. The module also comprises of dielectric layer(s) 6-4, a ground plane 6-6 and one or more contacts 6-7 from the SIM card to the ground plane. By this structure a capacitive element can be implemented between the dielectric layer(s) and the ground plane. The antenna of FIG. 6 can be named as a Non-radiating Resonator as a SIM antenna.

In this embodiment a resonator element 6-5 is used in the antenna elements and/or in the SIM card in conjunction with the mobile devices ground plane 6-6 and chassis, which can act as the other element of the resonator. The resonator element in the SIM card can be capacitive, inductive or dielectric. The connection to the resonator element in the SIM card can easily be arranged internally and the connection to the other element, i.e. the mobile device ground plane 6-6 via one or more SIM card contacts 6-2, 6-7.

The resonator element in the SIM card can form together with the mobile device ground layer a resonator with sufficiently broad bandwidth to work with mobile device models with different sizes of ground plates and when located in different places in the phone.

The resonator element can form the capacitive or the inductive coupling with the ground plane of the mobile device utilizing an electromagnetic field 6-8 in between them. However, the distance 6-9 between the resonator (the SIM card) and the ground plane may vary depending on the model and mechanical structure of the used mobile device. The values of the distance are typically about 0.5 mm-5 mm. The distance 6-9 between the capacitive elements are affecting to the capacitance and consequently the impedance, the bandwidth and the tuning frequency. To decrease the detuning effect there can be arranged dielectric layers 6-4 on both sides of the resonant element in the SIM card. In addition, by selecting material with high dielectric constant, the effect of the variation of the distance between the SIM card and the ground plane on the resonator performance can be reduced to acceptable level. In other words, the second metal layer can be arranged to the SIM card, to the mobile device and/or to the circuit board to be attached to the mobile device.

The resonator can also be without coupling with the ground plane. It can be for example a simple resonator circuit (RLC) connected in between the antenna input of the receiver and the ground of the SIM card and/or a filter to isolate the receiver subsystem (including SIM processor) from the RF frequency currents in the ground plane of the mobile device.

Figure 7:
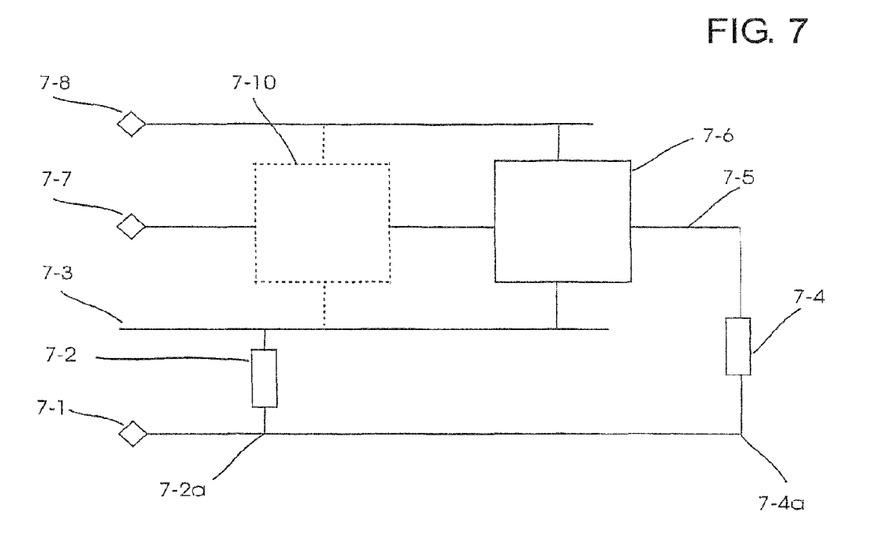
FIG. 7 shows a non-radiating resonator antenna according to the invention and its embodiments.
Figure 8:
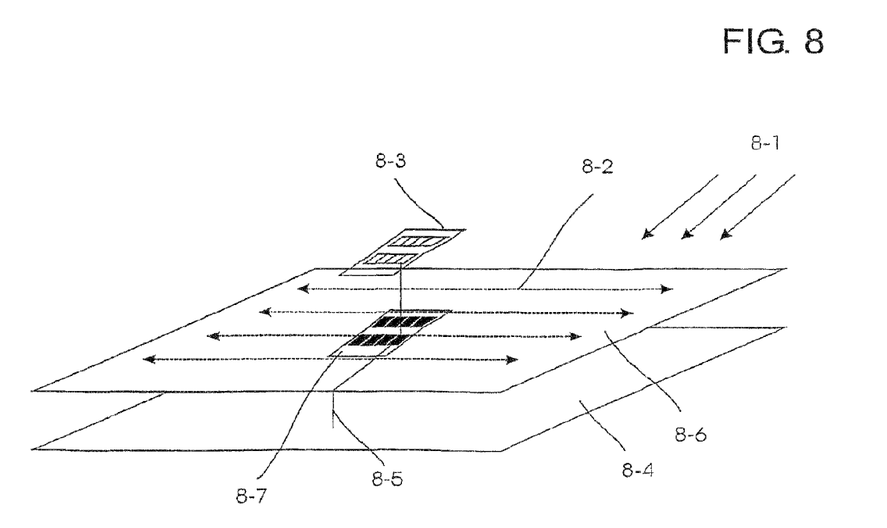
FIG. 8 shows a non-radiating resonator antenna according to the invention and its embodiments.

FIGS. 7 and 8 show a non-radiating resonator antenna according to the invention and its embodiments. The non-radiating resonator antenna can comprise a resonator circuit 7-4 tuned according to the receiver 7-6 frequency within the bandwidth of the receiver, connected to the receiver antenna input 7-5 and to the ground of the mobile device 7-1, which can be connected via the SIM contacts 2-2, 8-7 to the mobile device's ground plane 1-2, 8-6. The resonator circuit can be e.g. an LC oscillator. The resonator circuit can also be implemented as a filtering means, e.g. band pass filter. The grounds of the receiver and other circuits in the SIM card can be connected to the filtered ground, the SIM card ground 7-3, which can be connected to the ground 7-1 via the filter 7-2, which can allow DC current to pass, but is tuned to filter at least the frequency range of the receiver 7-6. A second or an alternative filter 7-2 can be implemented to filter the SIM Supply Voltage 7-8. The input/output (I/O) contact of the SIM card is shown by 7-7. 7-10 shows other possibly blocks to be used e.g. for processing purposes. The ground 7-3 can also be called as a virtual ground.

In other words, one or more filters 7-2 can be used to separate those frequencies coming from the ground plate so that the frequency of interest is passed through to the receiver input. For DC and low frequency return currents there can be a low pass filter in order to have noise free operation of the SIM card. The filter 7-2 can thus pass low frequencies and DC voltage, but it can block the RF signal.

In FIG. 8 the only antenna plate can be the ground layer of the mobile device and the resonator can sense the signal from that layer.

In this arrangement the RF signal radiation 8-1 can cause high frequency currents and subsequent voltages 8-2 into the ground plane 1-2, 8-6 of the mobile device, which can be connected to the ground 7-1 of the mobile device via the SIM contacts 2-2, 8-7. The ground 7-1 can thus by said to be noisy containing various radio frequency components. The filter 7-2 can remove high frequency component and passes the DC current to the clean filtered ground 7-3. The difference of the noisy ground 7-1 and clean filtered ground 7-3 can contain the received signal, which is passed to the receiver antenna input 7-5 via the resonator 7-4. The places of the filter 7-2 and the resonator 7-4 can be changed.

The resonator 7-4 can be implemented in several ways. It can comprise e.g. one or more of a dielectric component and/or one or more of a resistor and/or one or more of a capacitor and/or one or more of an inductor.

Also the filtering means 7-2 can be implemented in several ways. It can comprise one or more of a dielectric component and/or one or more of a resistor and/or one or more of a capacitor and/or one or more of an inductor and/or one or more of a transconductor. It can be active or passive, digital or analog, symmetric or asymmetric and be implemented by many different techniques, like gm-C technique.

The resonator, the receiving means and the filtering means can be implemented by one or more functional blocks.

The SIM card is represented by 8-3, the circuit board of the mobile device is represented by 8-4, the connection of mobile device ground plane 8-6 to the circuit board 8-4 is represented by 8-5 and the ground plane of the mobile device is represented by 8-6.

The antenna or the antenna arrangement according to the invention and its embodiments can be implemented in several ways. The first and the second metal layers can alternatively or in addition be conductive or semi conductive layers of other materials than metal, e.g. of plastic. The ground level of the SIM card can be connected to the ground level of the mobile device. The antenna can comprise a first metal plane which is at least partly between the first dielectric layer and/or the second dielectric layer, the first metal plane layer being adapted to be coupled with a second metal plane layer of the subscriber identity module and/or the mobile device whereby a resonator is formed between the first metal layer 6-5 and the second metal layer. When the metal layer of the mobile device is used, the resonator is formed when the antenna arrangement is installed in the mobile device.

The antenna can be manufactured in several ways. For example, it can be made as an ceramic component with the antenna element(s) built-in using a LTCC method, or as (flexible) Printed Circuit Board (PCB) with ceramic layers attached on both sides of it. Alternatively, the dielectric material can be sputtered on the surface of a ceramic chip antenna.

According to the invention and its embodiments many different types of dielectric materials can be used. These materials comprise e.g. $SrTiO_3$ and $Ba_xSr_{1-x}TiO_3$. The materials can have very high dielectric constant ($Er\sim300$ or even more) and low dielectric loss.

If the dielectric material, such as $SrTiO_3$ with dielectric constant $Er\sim300$, is used for layers 3-2, 4-2 and 3-3, 4-3, the electromagnetic wavelength in this material is substantially $1/300$ of the wavelength in free space. As an example, GPS L1 system can use the frequency of 1.575 GHz with free space wavelength about 190 mm. In said dielectric material the wavelength is ⅟₃₀₀×190 mm=0.633 mm and ¼ wavelength is 0.158 mm, respectively.

The invention and its embodiments have many advantages. It is cost efficient and easy to manufacture enabling thus the use of the GPS receiver in circumstances where traditional antennas would not work.

It will be obvious to a person skilled in the art that, as the technology advances, the inventive concept can be implemented in various ways. The invention and its embodiments are not limited to the examples described above but may vary within the scope of the claims.

The invention claimed is:

1. A module for wireless communication user equipment, comprising:
 a subscriber identity module having module inputs and outputs and a module ground;
 a ground plane configured to serve as an antenna plate, the antenna plate configured to receive a signal from a satellite positioning system;
 a receiver;
 a resonator configured to receive the signal received by the antenna plate from the satellite positioning system and configured to pass selected first frequencies of the signal to the receiver, the resonator being coupled between the ground plane and the receiver;
 a filter coupled between the ground plane and the subscriber identity module ground, the filter being configured to receive the signal from the antenna plate and pass selected second frequencies of the signal to the subscriber identity module ground, the selected second frequencies having a frequency range below a frequency range of the selected first frequencies passed to the receiver; and
 the receiver being configured to receive the selected first and second frequencies of the signal from the resonator and from the module ground;
 the module ground being configured to receive the selected second frequencies of the signal and configured to pass the selected second frequencies to the receiver and being connected thereto and connected to a module input contact for receiving a voltage from the ground plane of the user equipment via the filter.

2. The module according to claim 1 wherein the resonator, the filter, and/or the ground plane form a non-radiating resonator antenna.

3. The module according to claim 1 wherein the resonator comprises one or more components selected from dielectric component(s), resistor(s), or a combination of capacitor(s) and inductor(s).

4. The module according to claim 1 wherein the filter comprises one or more components selected from dielectric component(s), resistor(s), or a combination of capacitor(s) with inductor(s) and/or transconductor(s).

5. The module according to claim 1 further comprising a second filter for filtering a module supply voltage.

6. The module according to claim 1 further comprising one or more filters for separating frequencies from a ground plane of the user equipment so that one or selected frequencies are passed to an input of the receiver.

7. The module according to claim 1 wherein the resonator is configured to capacitively or inductively couple to the ground plane.

8. The module according to claim 1 wherein the resonator is implemented as a filtering means and/or the filter is implemented as a resonator means.

9. The module according to claim 1 wherein the subscriber identity module is configured to receive and process data from a positioning system signal to determine position and convey position data.

10. The module according to claim 1 wherein the receiver is configured to receive a signal from a GPS (Global Positioning System), NAVSTAR (NAVigation System using Timing And Ranging), GLONASS (Global Navigation Satellite System), GALILEO or other satellite positioning system for locating or for assisting in locating the user equipment.

11. The module according to claim 1 wherein the ground plane is a metallic layer, a plane, or a wire with different sizes and shapes in the user equipment and/or in a circuit board to be attached to the user equipment or a plane attached to the module.

12. A communication method comprising:
 receiving a signal from a satellite positioning system;
 transmitting the signal to a resonator and to a filter, the resonator and filter receiving the signal;
 the resonator passing selected first frequencies of the signal to a receiver in a first frequency range;
 the filter passing selected second frequencies in a second frequency range lower than the first frequency range to a module ground;
 the module ground passing the selected second frequencies to the receiver;
 wherein the receiver receives the selected first frequencies from the resonator and the selected second frequencies from the module ground.

13. A method according to claim 12, further comprising:
 calculating a current location of the user equipment based on data in the received signal.

14. A method according to claim 12, further comprising:
 determining data for positioning the user equipment from the received signal; and
 forwarding the data to a server for calculating a location of the user equipment; and
 receiving the location of the user equipment from the server.

15. Wireless communication user equipment for determining a user equipment location from a satellite positioning system comprising:
 a subscriber identification module;
 a ground plane serving as an antenna plate at signal frequencies emitted from one or more satellite positioning systems;
 a printed circuit board having an electrical connection to the ground plane;
 a receiver;
 a resonator established between the ground plane and the receiver for passing selected first frequencies from a received signal from the one or more satellite positioning systems to the receiver;
 a subscriber identification module ground connected to the receiver configured to pass selected second frequencies from the received signal to the receiver;
 wherein the receiver is configured to select user equipment location data from at least the first or second frequencies of the received signal.

16. The module according to claim 1, wherein the ground plane is configured to receive an input signal voltage, the input signal voltage being passed from the ground plane to the subscriber identity module via a supply voltage contact or a ground voltage contact.

17. The module according to claim 16, wherein,
 a voltage difference between the input signal voltage and the module ground represents the received signal, and the resonator is configured to convey selected frequencies of the received signal to the input of the receiver.

* * * * *